US 11,430,607 B2

(12) United States Patent
Iguchi et al.

(10) Patent No.: US 11,430,607 B2
(45) Date of Patent: Aug. 30, 2022

(54) CERAMIC ELECTRONIC COMPONENT

(71) Applicant: TDK CORPORATION, Tokyo (JP)

(72) Inventors: Toshihiro Iguchi, Tokyo (JP); Norihisa Ando, Tokyo (JP); Kenya Tamaki, Tokyo (JP); Kayou Matsunaga, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 17/322,079

(22) Filed: May 17, 2021

(65) Prior Publication Data

US 2021/0366654 A1    Nov. 25, 2021

(30) Foreign Application Priority Data

May 20, 2020   (JP) .............................. JP2020-088000

(51) Int. Cl.
| | |
|---|---|
| *H01G 4/232* | (2006.01) |
| *H01G 4/012* | (2006.01) |
| *H01G 4/30* | (2006.01) |
| *H01G 2/06* | (2006.01) |
| *H01G 4/008* | (2006.01) |
| *H01G 4/12* | (2006.01) |
| *H01G 4/248* | (2006.01) |
| *H01G 4/228* | (2006.01) |

(52) U.S. Cl.
CPC .............. *H01G 4/012* (2013.01); *H01G 2/065* (2013.01); *H01G 4/008* (2013.01); *H01G 4/1218* (2013.01); *H01G 4/232* (2013.01); *H01G 4/248* (2013.01); *H01G 4/30* (2013.01); *H01G 4/228* (2013.01)

(58) Field of Classification Search
CPC ........ H01G 4/012; H01G 2/065; H01G 4/008; H01G 4/1218; H01G 4/30
See application file for complete search history.

(56) References Cited

U.S. PATENT DOCUMENTS

| | | | |
|---|---|---|---|
| 2001/0043454 A1 | 11/2001 | Yoshii et al. | |
| 2002/0046861 A1* | 4/2002 | Yokoyama | ........... H01C 17/283 174/565 |
| 2021/0082621 A1* | 3/2021 | Kim | ..................... H01G 4/2325 |
| 2021/0366654 A1* | 11/2021 | Iguchi | .................. H01G 4/1218 |

FOREIGN PATENT DOCUMENTS

| | | | |
|---|---|---|---|
| CN | 207282317 U | * | 4/2018 |
| JP | H08330173 A | * | 12/1996 |
| JP | 2001-307947 A | | 11/2001 |
| JP | 2019117901 A | * | 7/2019 |

* cited by examiner

*Primary Examiner* — Dion R. Ferguson
(74) *Attorney, Agent, or Firm* — Oliff PLC (57) ABSTRACT

An electronic component according to the present invention is an electronic component including: a ceramic element body including an internal electrode; and an external electrode formed on an outer surface of the ceramic element body. The external electrode includes: a first electrode layer electrically connected to at least a part of the internal electrode; and a second electrode layer formed on an outside of the first electrode layer. The first electrode layer has a first conductor region containing copper, and the second electrode layer has a second conductor region including a matrix phase containing silver and palladium and copper particles dispersed in the matrix phase.

11 Claims, 5 Drawing Sheets

CERAMIC ELECTRONIC COMPONENT

TECHNICAL FIELD

The present invention relates to an electronic component including an external electrode.

BACKGROUND

When an electronic component such as a ceramic capacitor is mounted on a substrate such as a circuit substrate, a solder is often used as a jointing material for mounting the substrate. However, mounting with the solder is easily affected by a temperature change, and when subjected to a thermal shock, a crack may occur at a solder jointing portion due to a difference of expansion and contraction between the electronic component and the substrate.

Therefore, in recent years, a conductive adhesive in which an epoxy-based thermosetting resin contains Ag filler has attracted attention instead of the solder. The conductive adhesive contains a highly elastic resin, and thus, even if the conductive adhesive is subjected to a temperature change such as a thermal shock, a crack can be prevented from occurring at a jointing portion between an electronic component and a substrate.

When using the conductive adhesive, it is necessary to form an external electrode that is compatible with the conductive adhesive even in an electronic component that is an object to be jointed.

For example, Patent Document 1 discloses a capacitor in which a sintered electrode of Cu and a sintered electrode of Ag—Pd are laminated to form an external electrode having a two-layer structure, as an electronic component that can be mounted using a conductive adhesive. In the capacitor of Patent Document 1, a potential difference between the conductive adhesive and the external electrode is small, and potential corrosion can be prevented.

However, when a voltage is applied for a long time in a hot and humid environment after mounting on a substrate, an electromigration phenomenon or a decrease in an insulation resistance may occur, and the durability is not always sufficient in the technique of Patent Document 1. Therefore, a further improvement of the durability in the hot and humid environment is required.

[Patent Document 1] JP Patent Application Laid Open No. 2001-307947

SUMMARY

The present invention is achieved in view of such circumstances, and an object of the present invention is to provide an electronic component that can be mounted using a conductive adhesive and has an excellent durability in a hot and humid environment.

In order to accomplish the above object, an electronic component according to the present invention is an electronic component including:

a ceramic element body including an internal electrode; and an external electrode formed on an outer surface of the ceramic element body, wherein the external electrode includes:

a first electrode layer electrically connected to at least a part of the internal electrode; and a second electrode layer formed on an outside of the first electrode layer, the first electrode layer has a first conductor region containing copper; and the second electrode layer has a second conductor region including a matrix phase containing silver and palladium, and copper particles dispersed in the matrix phase.

As described above, the external electrode in the electronic component according to the present invention includes at least two electrode layers. Then, the second electrode layer in contact with a conductive adhesive after mounting contains the copper particles in addition to the matrix phase of Ag—Pd. According to above a configuration, even if a voltage is applied for a long time in a hot and humid environment, an electromigration phenomenon will not occur and durability of the electronic component will be improved.

The matrix phase in the second conductor region may further contain copper. In this case, assuming that a total content of silver, palladium, and copper in the matrix phase of the second conductor region is 100 mol %, it is preferable that a palladium content is 2 mol % to 10 mol %, a copper content is 5 mol % to 11 mol %, and a balance is silver.

Preferably, an average particle size of the copper particles contained in the second conductor region is 0.5 μm to 5.0 μm.

Preferably, a ratio ($A_P/A_M$) of $A_P$ to $A_M$ is 3% to 15%, in which $A_M$ is an area occupied by the matrix phase and $A_P$ is an area occupied by the copper particles, in a cross section of the second electrode layer.

As described above, by controlling the average particle size and the area ratio of the copper particles within above predetermined range, the durability of the electronic component in the hot and humid environment is further improved. It is noted that the copper particles contained in the second conductor region may contain palladium or/and silver.

Preferably, an area ratio occupied by the first conductor region in a cross section of the first electrode layer is larger than an area ratio occupied by the second conductor region in a cross section of the second electrode layer. According to such a configuration, the first electrode layer located inside becomes dense, and a moisture resistance is further improved. The second electrode layer located outside is sparser than the first electrode layer, and thus, an anchor effect is obtained and adhesiveness between the external electrode and the conductive adhesive is improved.

In the electronic component of the present invention, the first electrode layer may include a first non-metal portion dispersed in the first electrode layer in addition to the first conductor region, and the second electrode layer may include a second non-metal portion dispersed in the second electrode layer in addition to the second conductor region. Preferably, an aspect ratio of the second non-metal portion in a cross section of the second electrode layer is larger than an aspect ratio of the first non-metal portion in a cross section of the first electrode layer. By reducing the aspect ratio of the first non-metal portion in this way, the moisture resistance is further improved. By increasing the aspect ratio of the second non-metal portion, the anchor effect can be obtained and the adhesiveness between the external electrode and the conductive adhesive is improved.

Preferably, the first electrode layer contains particles containing a silicon oxide as the first non-metal portion, and the second electrode layer contains particles containing a silicon oxide as the second non-metal portion. In addition, it is preferable that the second electrode layer has a higher content of the particles containing the silicon oxide than that of the first electrode layer.

According to such a configuration, the second electrode layer is sparse than the first electrode layer, and the adhesiveness between the external electrode and the conductive adhesive is further improved.

Preferably, particles containing an aluminum oxide as a main ingredient are contained as the second non-metal portion near a surface of the second electrode layer. According to such a configuration, the surface of the second electrode layer is roughened, and the adhesiveness between the external electrode and the conductive adhesive is further improved by the anchor effect. As a result, the durability of the electronic component in the hot and humid environment is further improved.

DETAILED DESCRIPTION

Figure 1:
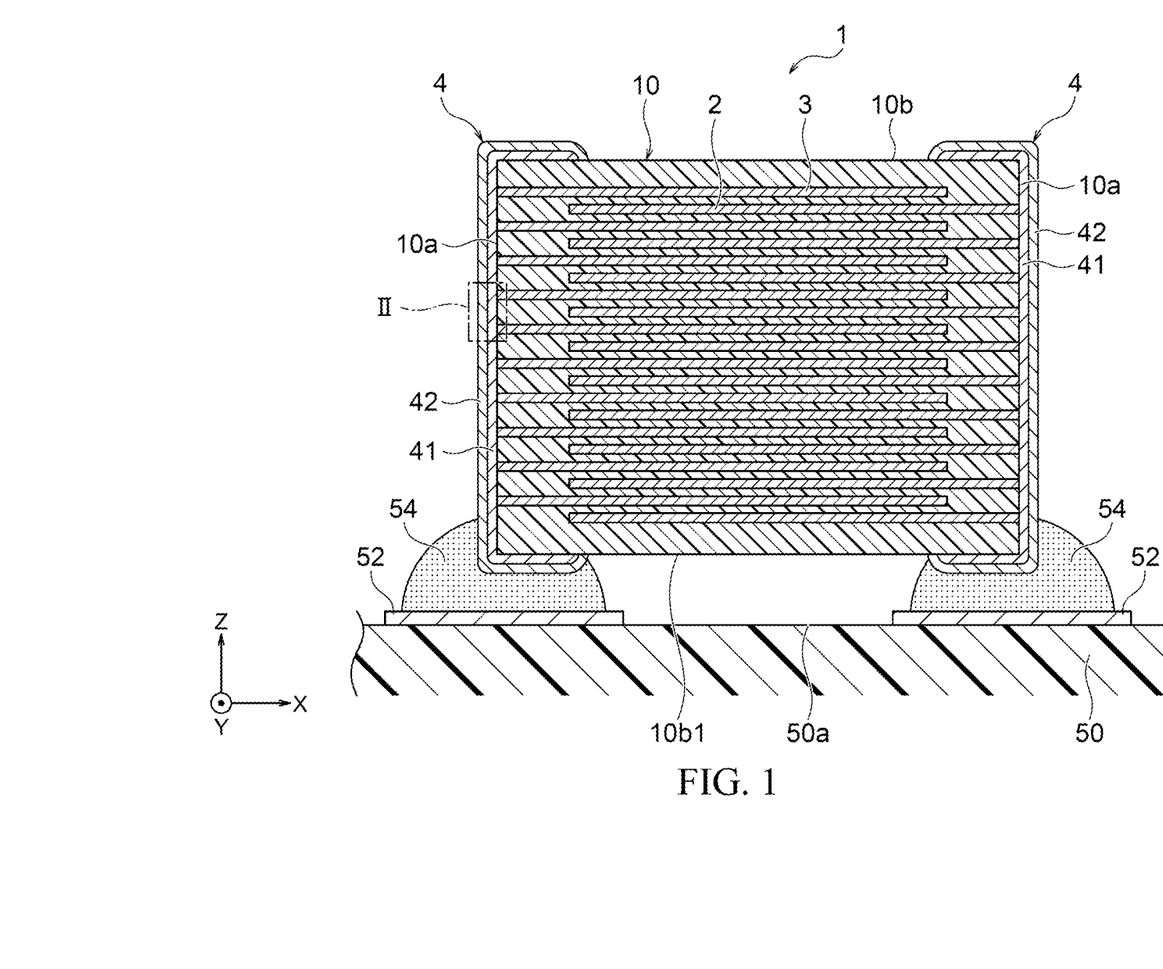
FIG. 1 is a schematic view showing a cross section of a multilayer ceramic capacitor after mounting according to an embodiment of the present invention.

First, a multilayer ceramic capacitor 1 is described as an embodiment of an electronic component according to the present invention. FIG. 1 shows a cross-sectional view of the general multilayer ceramic capacitor 1.

As shown in FIG. 1, the multilayer ceramic capacitor 1 includes a ceramic element body 10. The ceramic element body 10 includes ceramic layers 2 and internal electrode layers 3 which are substantially parallel to a plane including an X-axis and a Y-axis. Inside the ceramic element body 10, the ceramic layers 2 and the internal electrode layers 3 are alternately laminated along a Z-axis direction. Here, "substantially parallel" means that most portions are parallel and there may be a portion that is slightly not parallel. The ceramic layers 2 and the internal electrode layers 3 may be slightly uneven or tilted.

A shape of the ceramic element body 10 shown in FIG. 1 is substantially a rectangular parallelepiped shape. Then, the ceramic element body 10 has two end surfaces 10a facing each other in the X-axis direction, two side surfaces 10b facing each other in the Y-axis direction, and two side surfaces 10b facing each other in the Z-axis direction. However, the shape of the ceramic element 10 is not particularly limited, and may be an elliptical cylinder shape, a cylinder shape, or any other prismatic shape. External dimensions of the ceramic element body 10 are not particularly limited, and for example, a length in the X-axis direction can be 0.6 mm to 5.7 mm, a width in the Y-axis direction can be 0.3 mm to 5.0 mm, and a height in the Z-axis direction can be 0.3 mm to 3.0 mm.

FIG. 1 shows the embodiment as the multilayer ceramic capacitor 1, and thus, the ceramic layers 2 laminated inside the ceramic element body 10 may be made of a dielectric ceramic. A specific material of the ceramic layers 2 is not particularly limited, and for example, a dielectric ceramic such as $BaTiO_3$, $CaTiO_3$, $SrTiO_3$, $CaZrO_3$, $(K_{1-x}Na_x)Sr_2Nb_5O_{15}$, $Ba_3TiNb_4O_{15}$, and $(K_{1-x}Na_x)NbO_3$ is used as a main component. In addition to the main component, one or more kinds of sub-components such as a Mn compound, a Mg compound, a Cr compound, a Co compound, a Ni compound, a rare earth element, a Si compound, a Li compound, and a V compound may be added.

A thickness of the ceramic layers 2 is not particularly limited, and for example, the thickness of the ceramic layers 2 can be 0.5 μm to 100 μm per layer. The number of the ceramic layers 2 to be laminated may be determined according to a desired characteristic and is not particularly limited. For example, the number of the ceramic layers 2 to be laminated is preferably 20 or more, more preferably 50 or more.

Meanwhile, the internal electrode layers 3 are laminated between the ceramic layers 2, and the number of the internal electrode layers to be laminated is determined according to the number of the ceramic layers 2 to be laminated. A thickness of the internal electrode layers 3 is not particularly limited, and can be, for example, 0.3 μm to 3.0 μm.

The internal electrode layers 3 are laminated such that a part of an end portions are alternately exposed to the two end surfaces 10a of the ceramic element body 10 that face each other in the X-axis direction. A pair of external electrodes 4 are formed on the two end surfaces 10a of the ceramic element body 10 and are electrically connected to exposed ends of the alternately arranged internal electrode layers 3. By forming the external electrodes 4 in this way, the external electrodes 4 and the internal electrode layers 3 form a capacitor circuit.

That is, the internal electrode layers 3 function as a part of the capacitor circuit to apply a voltage to the ceramic layers 2. Therefore, the internal electrode layers 3 contain a conductive material. As the conductive material, for example, Cu, Ni, Ag, Pd, Au, Pt, or an alloy containing at least one of these metal elements can be used. More preferably, the conductive material contained in the internal electrode layers 3 is a Ni or Ni-based alloy because the main component of the ceramic layers 2 has a reduction resistance. When using the Ni or Ni-based alloy, one or more kinds of sub-components selected from Mn, Cu, Cr, Fe, and the like may be contained in the conductive material.

In addition to the above conductive materials, the internal electrode layers 3 may contain a ceramic ingredient contained in the ceramic layers 2 as an inhibitor, or may contain a small quantity of non-metal ingredients such as S and P.

As shown in FIG. 1, the external electrodes 4 of the present embodiment integrally include end surface portions formed on the end surfaces 10a and extension portions formed on a part of the four side surfaces 10b. That is, each of the external electrodes 4 is formed to wrap around from the end surfaces 10a to the part of the side surfaces 10b. Further, the pair of external electrodes 4 are insulated so as not to come into contact with each other in the X-axis direction.

As described above, in the present embodiment, the extension portions of the external electrodes 4 are formed on the four side surfaces 10b of the ceramic element body 10. However, the extension portions of the external electrodes 4 may be formed on at least a side surface 10b1 close to a mounting surface (that is, a lower surface in the Z-axis direction near a mounting substrate 50), and may not be formed on the side surface 10b (an upper surface in the Z-axis direction) opposite to the mounting surface.

Figure 2:
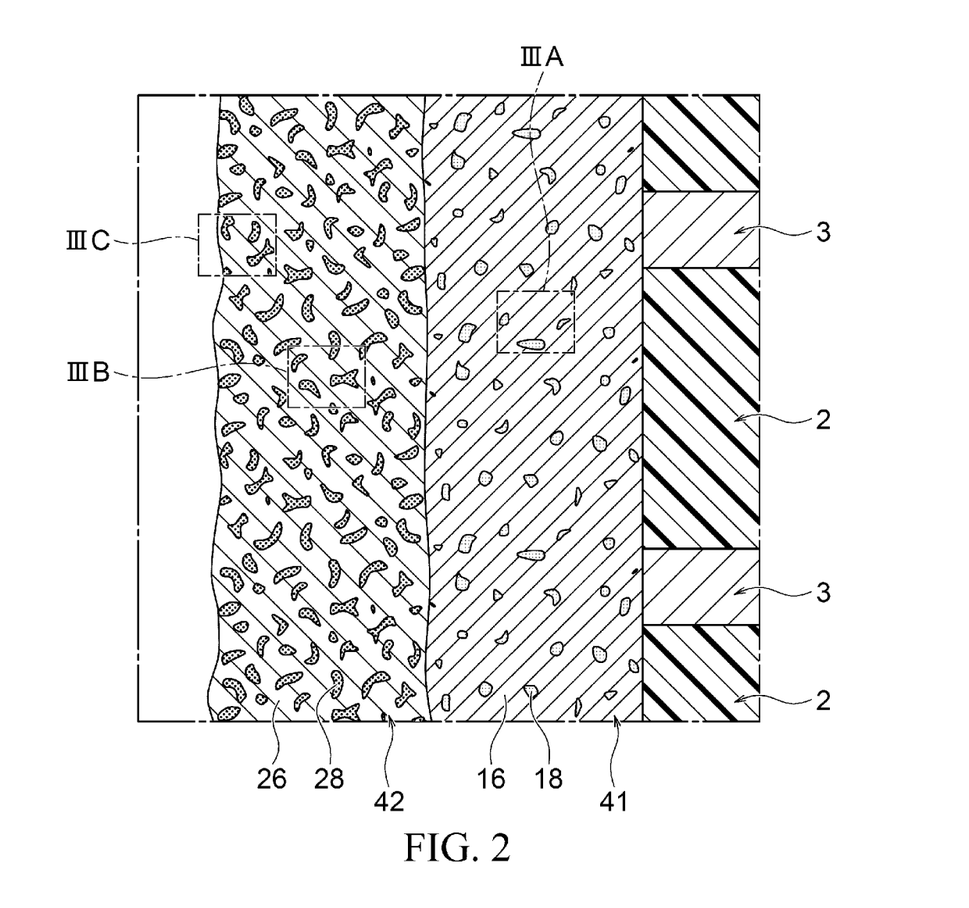
FIG. 2 is an enlarged view of a region II shown in FIG. 1.

FIG. 2 is an enlarged cross-sectional view of a part of the external electrode 4. As shown in FIG. 2, in the present embodiment, the external electrode 4 includes at least a first electrode layer 41 and a second electrode layer 42, and has a laminated structure. The first electrode layer 41 is located on a side in contact with the ceramic element body 10, and is electrically connected to the internal electrode layers 3 exposed on the end surface 10a. Meanwhile, the second electrode layer 42 is located outside the first electrode layer 41. That is, the second electrode layer 42 is directly jointed to a conductive adhesive 54, after mounting on the substrate 50. It is noted that although FIG. 2 shows only an end surface portion of one external electrode 4 in the pair of external electrodes 4, the other external electrode 4 also has the same configuration. Further, there is no difference in the laminated structure of the first electrode layers 41 and the second electrode layers 42 between the end surface portions and the extension portions of the external electrodes 4.

A thickness of the first electrode layer 41 can be 5 µm to 200 µm, preferably 10 µm to 100 µm. Meanwhile, a thickness of the second electrode layer 42 can be 10 µm to 200 µm, preferably 20 µm to 100 µm. The second electrode layer 42 preferably covers the entire first electrode layer 41. In more detail, even on distal end sides of the extension portions of the external electrode 4, it is preferable that the second electrode layer 42 covers the first electrode layer 41 and the first electrode layer 41 is not exposed on an outermost surface of the external electrode 4.

Both the first electrode layer 41 and the second electrode layer 42 are configured by a sintered electrode including a conductor region and a non-metal portion. In the present embodiment, the conductor region and the non-metal portion of the first electrode layer 41 are referred to as a first conductor region 16 and a first non-metal portion 18, respectively. The conductor region and the non-metal portion of the second electrode layer 42 are referred to as a second conductor region 26 and a second non-metal portion 28, respectively.

Figure 3A:
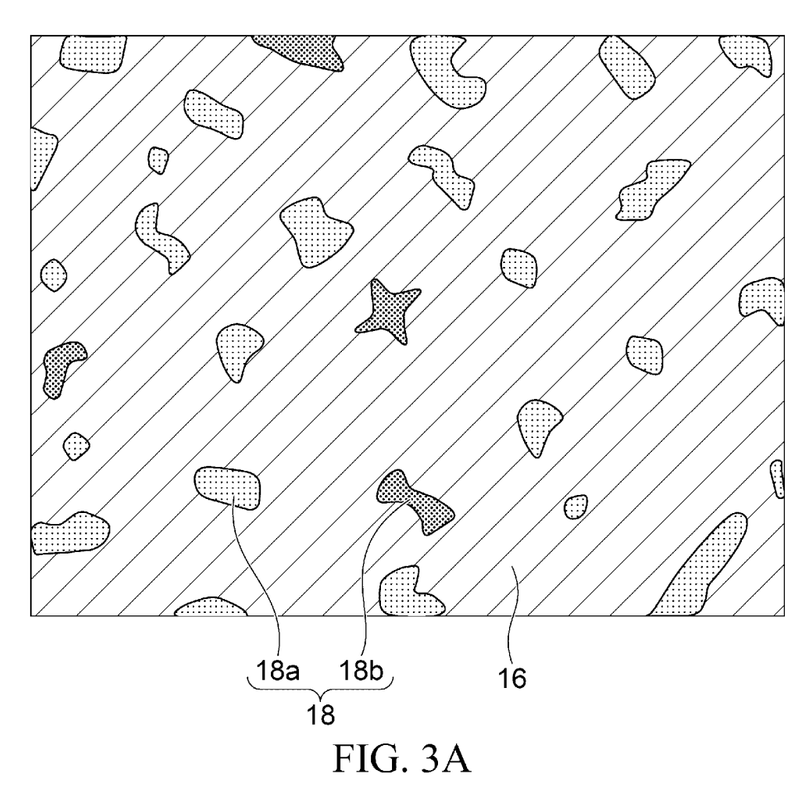
FIG. 3A is an enlarged view of a region IIIA shown in FIG. 2.

FIG. 3A is a schematic view of an enlarged cross section of the first electrode layer 41. The first conductor region 16 contains Cu as a main component, and may be a pure Cu or an alloy containing Cu, and is preferably the pure Cu. When the first conductor region 16 is a Cu alloy, the first conductor region 16 may contain Al, Ni, Ag, Pd, Sn, Zn, P, Fe, Mn, and the like in addition to Cu. The amount of the elements other than Cu is preferably 5 mol parts or less with respect to 100 mol parts of Cu.

The first non-metal portion 18 is dispersed in the first electrode layer 41 and contains inorganic particles 18a and voids 18b. The inorganic particles 18a of the first non-metal portion 18 are mainly formed by oxides and may be non-vitrified oxide particles or glass particles. Examples of the oxides contained in the inorganic particles 18a include silicon oxide ($SiO_2$), zinc oxide (ZnO), boron oxide ($B_2O_3$), aluminum oxide ($Al_2O_3$), strontium oxide (SrO), magnesium oxide (MgO), barium oxide (BaO), vanadium oxide ($V_2O_5$), calcium oxide (CaO), titanium oxide ($TiO_2$), zirconium oxide ($ZrO_2$), sodium oxide ($Na_2O$), potassium oxide ($K_2O$), and the like, or composite oxides such as $BaTiO_3$ consisting of two or more of the above oxides. When the inorganic particles 18a are vitrified, an ingredient of the inorganic particles can be, for example, B—Si-alkali metal-based, B—Si—Zn-alkali metal-based, B—Si—K-based, or B—Si—Al-based borosilicate glass.

The inorganic particles 18a contained in the first non-metal portion 18 may contain particles having one composition or may contain particles having various compositions. In the present embodiment, the inorganic particles 18a of the first non-metal portion 18 preferably contain particles containing at least $SiO_2$ as a main component (hereinafter, referred to as $SiO_2$ particles), and preferably contain particles containing $BaTiO_3$ as the main component (hereinafter, referred to as $BaTiO_3$ particles) in addition to the $SiO_2$ particles. It is noted that the $SiO_2$ particles may or may not be vitrified.

In the present embodiment, the first electrode layer 41 is preferably a denser electrode than the second electrode layer 42 which will be described later. For example, the first electrode layer 41 preferably has a higher content ratio of the conductor region than that of the second electrode layer 42. Specifically, an area ratio occupied by the first conductor region 16 in the cross section of the first electrode layer 41 can be 60% to 95%, preferably 75% to 95%. The first electrode layer 41 preferably has a lower content ratio of voids than that of the second electrode layer 42. Specifically, an area ratio occupied by the voids 18b in the cross section of the first electrode layer 41 can be 10% or less, preferably 5% or less.

The area ratio occupied by the first conductor region 16 and the area ratio occupied by the voids 18b can be measured by observing the cross section of the first electrode layer 41 with a scanning electron microscope (SEM) or a scanning transmission electron microscope (STEM) and analyzing a cross section image of the first electrode layer. In a reflected electron image of the SEM or a bright field image of the STEM, the first conductor region 16 can be recognized as a bright contrast portion, and the first non-metal portion 18 can be recognized as a dark contrast portion. In particular, the voids 18b can be recognized as a darkest contrast portion. Therefore, the area ratio occupied by the first conductor region 16 can be calculated as a ratio of an area of the bright contrast portion to an area of an entire measurement visual field by, for example, binarizing the cross section image. The area ratio occupied by the voids 18b can be calculated as a ratio of an area occupied by the darkest contrast portion to the area of the entire measurement visual field. It is noted that the area ratios are preferably calculated as average values obtained by performing the above measurements in at least 5 visual fields.

In the first electrode layer 41, the first non-metal portion 18 preferably contains particles having an aspect ratio smaller than those of the second non-metal portion 28 of the second electrode layer 42. Specifically, the aspect ratio of the first non-metal portion 18 in the first electrode layer 41 can be 2.5 or less, more preferably 1.5 to 2.0. The aspect ratio of the first non-metal part 18 can be measured by analyzing the cross section image observed by the reflected electron image of the SEM or the bright field image of the STEM, and is expressed as a ratio of a maximum width in a longitudinal direction to a maximum width in a lateral direction of constituent particles. It is noted that the aspect ratio is calculated as an average value obtained by measuring at least 10 constituent particles.

Figure 3B:
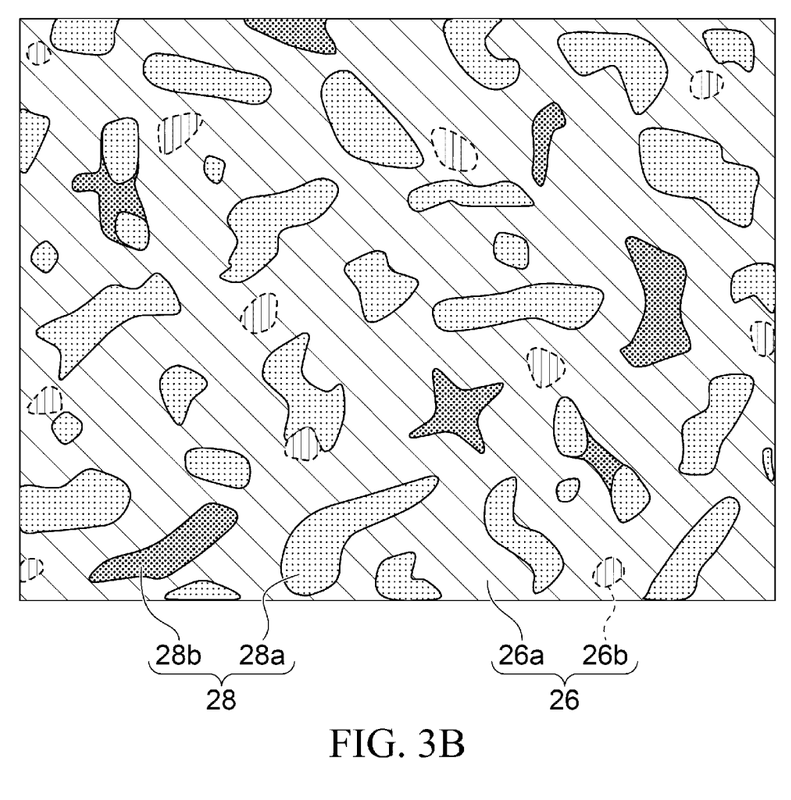
FIG. 3B is an enlarged view of a region IIIB shown in FIG. 2.
Figure 3C:
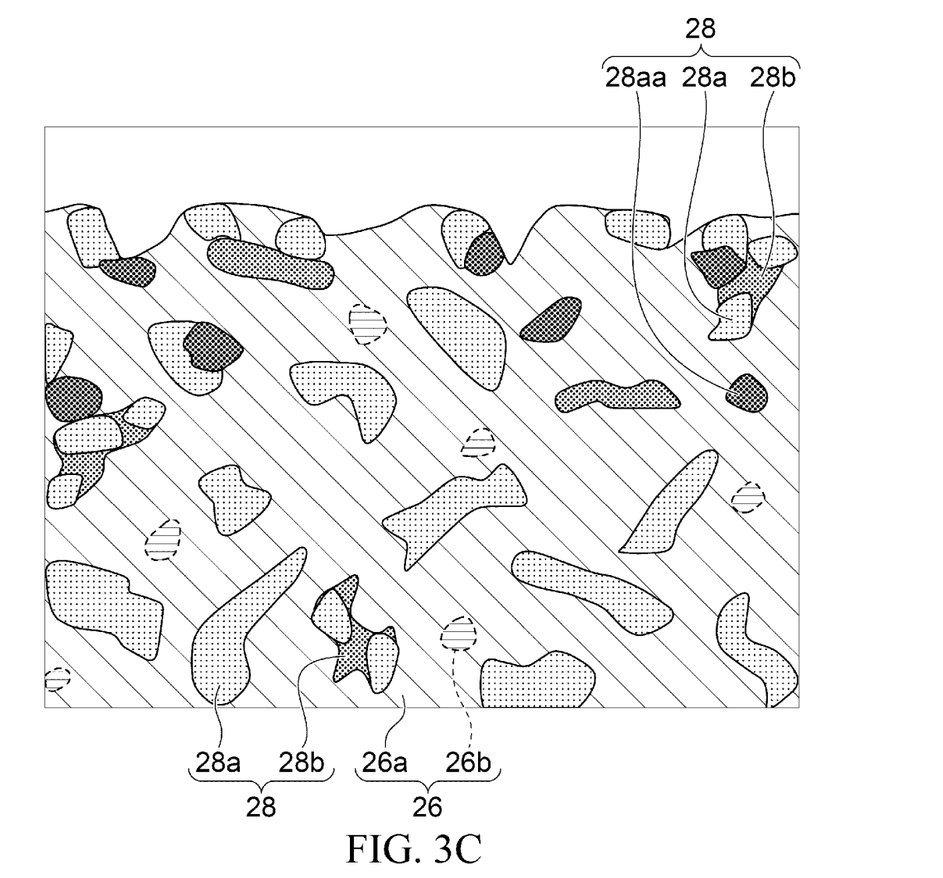
FIG. 3C is an enlarged view of a region IIIC shown in FIG. 2.

Meanwhile, FIGS. 3B and 3C are schematic views of enlarged cross sections of the second electrode layer 42. In particular, FIG. 3C is an enlarged cross section near an outermost surface of the second electrode layer 42, that is, an enlarged cross section near the outermost surface of the external electrode 4.

The second conductor region 26 of the second electrode layer 42 includes a matrix phase 26a and copper particles 26b dispersed in the matrix phase. The matrix phase 26a is an Ag—Pd alloy containing Ag and Pd as main components, and may also contain Cu (in this case, Ag—Pd—Cu alloy). Assuming that a total content of the main components in the matrix phase 26a is 100 mol %, it is preferable that a Pd content is 2 mol % to 10 mol % and the balance is Ag. When Cu is further contained in the matrix phase 26a, assuming that a total content of Ag, Pd, and Cu is 100 mol %, it is preferable that a Pd content is 2 mol % to 10 mol %, a Cu content is 5 mol % to 11 mol %, and the balance is Ag. Furthermore, the Pd content is more preferably 2 mol % to 5 mol % in either case of the Ag—Pd alloy or the Ag—Pd—Cu alloy.

The matrix phase 26a may contain a sub-component such as Sb and Ni and unavoidable impurities in addition to the above main components (Ag, Pd, Cu). It is noted that when the sub-component is contained, a content of the sub component is preferably 1 part by weight or less with respect to 100 parts by weight of the main components.

The copper particles 26b constituting a part of the second conductor region 26 contain Cu as a main component, and may also contain Ag or/and Pd. When the copper particles 26b contain Ag or/and Pd, an Ag content and a Pd content in the copper particles 26b are either preferably 5 mol % or less.

Presence or absence of the copper particles 26b in the second electrode layer 42 can be confirmed by observing the cross section of the second electrode layer 42 by the SEM or the STEM and performing a mapping analysis by an electron probe microanalyzer (EPMA) at that time. As an X-ray spectroscope of the EPMA, an energy dispersive spectroscopy (EDS) or a wavelength dispersive spectroscopy (WDS) can be used. Hereinafter, a method for specifying the copper particles 26b is described in detail.

First, the multilayer ceramic capacitor 1 is cut and a cut surface of the multilayer ceramic capacitor is mirror-polished to expose the cross section as shown in FIG. 1. In particular, when observing the cross section with the STEM, a thin sample is collected from the cross section of the external electrode 4 (in particular, the second electrode layer 42) by a micro sampling method using a focused ion beam (FIB).

After preparing the sample for observation by the method as described above, a cross section of the second electrode layer 42 as shown in FIG. 3A is observed by the SEM or the STEM. A magnification and a size of a visual field at the time of observation are not particularly limited, and it is preferable that the magnification is 1000 times to 30000 times and the size of the visual field is in a range corresponding to 10 μm square to 100 μm square. In this observation visual field, the mapping analysis with the EPMA is performed, and mapping images relating to an Ag element, a Pd element, a Cu element, and the like are acquired. It is noted that in the mapping analysis, a clear mapping image is obtained by performing an analysis with a sufficient spatial resolution ensured based on a usual analysis technique.

The obtained mapping image of the Cu element is analyzed to identify the copper particles 26b. Specifically, an average concentration of the Cu element in the entire mapping image is calculated, and a region where a concentration is 5 times or more the average concentration is extracted as the copper particles 26b. In this way, the presence or absence of the copper particles 26b can be confirmed. In the above image analysis, a dispersed state of the copper particles 26b can be evaluated by calculating a circle equivalent diameter and an area ratio of the extracted copper particles 26b.

An average particle size of the copper particles 26b in the second electrode layer 42 can be 0.2 μm to 10 μm in terms of the circle equivalent diameter conversion, and is preferably 0.5 μm to 5 μm. In the cross section of the second electrode layer 42, assuming that an area occupied by the matrix phase 26a is $A_M$ and an area occupied by the copper particles 26b is $A_P$, a ratio of $A_P$ to $A_M$ ($A_P/A_M$) is 1% to 20%, preferably 3% to 15%. Here, the area $A_M$ occupied by the matrix phase 26a is defined as an area of a region where the Ag element and the Pd element overlap in the above mapping analysis. The circle equivalent diameter or the area ratio of the copper particles 26b is preferably calculated as an average value obtained by performing the above mapping analysis in at least 5 visual fields.

It is noted that a composition of the copper particles 26b, that is, the Ag content or the Pd content in the copper particles 26b can be measured by performing a point analysis with the EPMA after specifying the copper particles 26b by the above mapping analysis.

As described above, the second conductor region 26 of the second electrode layer 42 is characterized by containing the copper particles 26b in addition to the matrix phase 26a.

The second non-metal portion 28 is dispersed in the second electrode layer 42 and contains inorganic particles 28a and voids 28b. The inorganic particles 28a of the second non-metal portion 28 are mainly formed by oxides and may be non-vitrified oxide particles or glass particles. Examples of the oxides contained in the inorganic particles 28a include silicon oxide ($SiO_2$), zinc oxide (ZnO), boron oxide ($B_2O_3$), aluminum oxide ($Al_2O_3$), strontium oxide (SrO), magnesium oxide (MgO), barium oxide (BaO), vanadium oxide ($V_2O_5$), calcium oxide (CaO), titanium oxide ($TiO_2$), zirconium oxide ($ZrO_2$), sodium oxide ($Na_2O$), potassium oxide ($K_2O$), and the like, or composite oxides consisting of two or more of the above oxides. When the inorganic particles 28a are vitrified, an ingredient of the inorganic particles can be, for example, B—Si-alkali metal-based, B—Si—Zn-alkali metal-based, B—Si—K-based, or B—Si—Al-based borosilicate glass.

The inorganic particles 28a contained in the second non-metal portion 28 may contain particles having one composition or may contain particles having various compositions. In the present embodiment, the inorganic particles 28a of the second non-metal portion 28 preferably contain particles containing at least $SiO_2$ as a main component (hereinafter, referred to as $SiO_2$ particles). The $SiO_2$ particles may or may not be vitrified.

As described above, the first non-metal portion 18 of the first electrode layer 41 may also contain the $SiO_2$ particles, and a content of the $SiO_2$ particles is preferably higher in the second electrode layer 42 than in the first electrode layer 41. Specifically, an area ratio occupied by the $SiO_2$ particles in the cross section of the first electrode layer 41 can be 0% to 15%, preferably 10% or less, and more preferably 5% or less. Meanwhile, an area ratio of the $SiO_2$ particles in the cross section of the second electrode layer 42 can be 2% to 25%, preferably 5% to 25%.

In the above description, the area ratios of $SiO_2$ particles can be measured by performing mapping analysis with the EPMA. Specifically, in the cross sections of the electrode layers 41 and 42, a mapping image of a Si element is acquired, a region where the Si element is detected is extracted from the mapping image, and an area ratio of the region is measured. It is noted that the area ratios of $SiO_2$ particles are preferably calculated as average values obtained by performing the above measurements in at least 5 visual fields.

In the present embodiment, as shown in FIG. 3C, it is preferable that particles containing $Al_2O_3$ (hereinafter, $Al_2O_3$ particles 28aa) as a main component are present as the inorganic particles 28a near the surface of the second electrode layer 42. A region where the $Al_2O_3$ particles 28aa are present is preferably in a range of 10 μm or less in a depth direction from the outermost surface of the second electrode layer 42. Alternatively, the region where the $Al_2O_3$ particles 28aa are present near the surface is preferably a region of about 1/10 to 1/4 with respect to an average thickness of the second electrode layer 42. By existing the $Al_2O_3$ particles 28aa near the surface of the second electrode layer 42, a surface roughness of the second electrode layer tends to be rough.

Further, the second electrode layer 42 is preferably a sparser electrode than the first electrode layer 41. For example, the second electrode layer 42 preferably has a lower content ratio of the conductor region than that of the first electrode layer 41. Specifically, an area ratio occupied by the second conductor region 26 in the cross section of the second electrode layer 42 can be 60% to 95%, preferably 60% to 85%. The second electrode layer 42 preferably has a higher content ratio of voids than that of the first electrode layer 41. Specifically, an area ratio occupied by the voids 28b in the cross section of the second electrode layer 42 can be 2% to 38%, preferably 13% to 35%. It is noted that the area ratio occupied by the second conductor region 26 and the area ratio occupied by the voids 28b may be calculated by analyzing a cross section image of the SEM or the STEM, as in the case of the first electrode layer 41.

The second non-metal portion 28 of the second electrode layer 42 contains preferably particles having a larger aspect ratio than that of the first non-metal portion 18 of the first electrode layer 41. Specifically, the aspect ratio of the second non-metal portion 28 can be 1.5 to 4.5, preferably 2.5 to 4.0, and more preferably 3.0 to 4.0. It is noted that the aspect ratio of the second non-metal portion 28 may also be calculated by analyzing a cross section image of the SEM or the STEM, as in the case of the first non-metal portion 18.

The above are characteristics of the first electrode layer 41 and the second electrode layer 42. It is noted that in the multilayer ceramic capacitor 1 of the present embodiment, the external electrode 4 may include a layer other than the first electrode layer 41 and the second electrode layer 42. For example, a diffusion layer may be formed between the first electrode layer 41 and the ceramic element body 10 by mutual diffusion of a metal ingredient of the first electrode layer 41 and a metal ingredient of the internal electrode layers 3. Further, between the first electrode layer 41 and the ceramic element body 10, a layer containing a glass ingredient, or an oxide, etc., may be present in a form of not interfering with electrical contact between the first electrode layer 41 and the internal electrode layers 3. Furthermore, the diffusion layer and other electrode layers may also be present between the first electrode layer 41 and the second electrode layer 42.

Next, an example of a method for manufacturing the multilayer ceramic capacitor 1 shown in FIG. 1 is described below.

First, a manufacturing process of the ceramic element body 10 will be described. In the manufacturing process of the ceramic element body 10, a dielectric paste serving as the ceramic layers 2 after firing and a conductive paste serving as the internal electrode layers 3 after firing are prepared.

The dielectric paste is prepared, for example, by the following method. First, a dielectric raw material is uniformly mixed by a method such as wet mixing and is dried. Then, a heat treatment is performed under a predetermined condition to obtain a calcined powder. Next, a well-known organic vehicle or a well-known water-based vehicle is added to the obtained calcined powder and is kneaded to prepare the dielectric paste. Ceramic green sheets are obtained by forming the dielectric paste thus obtained in a sheet form.

Meanwhile, the conductive paste is prepared by kneading fine particles containing a conductive metal or an alloy thereof with a well-known binder or solvent.

Next, the conductive paste is applied on the ceramic green sheets in a predetermined pattern by various printing methods such as a doctor blade method and screen printing. Then, the ceramic green sheets printed the conductive paste are laminated and then is pressed in a laminating direction to obtain a mother laminated body. At this time, the ceramic green sheets and the conductive paste are laminated so that the ceramic green sheets are located on an upper surface and a lower surface in the laminating direction of the mother laminated body.

The mother laminated body obtained by the above process is cut by dicing or push-cutting to obtain a plurality of green chips. The ceramic element body 10 is obtained by firing the green chips after a binder removal treatment. At this time, the firing may be performed under a well-known condition, and for example, a firing temperature can be 1100° C. to 1400° C. The binder removal treatment and the firing may be performed after cutting as described above, or may be performed on the mother laminated body before cutting.

Next, the pair of external electrodes 4 are formed on the ceramic element body 10 thus obtained. First, a first electrode metal paste is applied from the end surfaces 10a to a part of the side surfaces 10b of the ceramic body 10, and is then dried. Then, a second electrode metal paste is applied and dried to completely cover a portion to which the first electrode metal paste is applied. As an applying method of these electrode metal pastes, dipping, various printing methods, etc., can be applied. After applying these electrode metal pastes, the ceramic element body 10 is heated at a temperature of 700° C. to 900° C., and a pair of the external electrodes 4 each including the first electrode layer 41 and the second electrode layer 42 are formed.

It is noted that the first electrode metal paste and the second electrode metal paste are both obtained by kneading metal particles serving as a conductor region, inorganic particles serving as a non-metal portion, other binders, solvents, etc. In particular, the second electrode metal paste is prepared by adding Cu particles in addition to Ag—Pd alloy particles or Ag—Pd—Cu alloy particles serving as the matrix phase 26a. At this time, by controlling a composition, a particle size, an addition amount, etc., of the Cu particles to be added, the composition, a particle size, and the area ratio of the copper particles 26b in the second electrode layer 42 after sintering can be controlled within a predetermined range.

Moreover, the area ratio of the conductor region, the aspect ratio of the non-metal portion, etc., in each electrode layer can be controlled by a form and an addition amount of inorganic particles to be added, a form and an addition amount of a binder, etc. For example, when the addition amount of the binder is increased, the voids 18b and 28b are likely to be formed after sintering, and the area ratio of the conductor region tends to decrease. As the binder, it is preferable to use a resin that is difficult to dissolve in a paste, for example, Teflon (registered trademark), polyethylene, polypropylene, and phenol. Then, by changing a shape of a resin as the binder to a powder having a large aspect ratio, an electrode after sintering can be made sparse (that is, the area ratio of the conductor region becomes low. Alternatively, the aspect ratio of the non-metal portion becomes large). Meanwhile, in order to make an electrode dense after sintering, the addition amount of the binder can be reduced, and a particle size and an aspect ratio of inorganic particles in the paste can be reduced.

When the $Al_2O_3$ particles 28aa are contained only near the surface in the second electrode layer 42, a second electrode metal paste that does not contain the $Al_2O_3$ particles is applied, and then a second electrode metal paste that contains the $Al_2O_3$ particles may be further applied thereon and baked. It is noted that the thicknesses of the electrode layers 41 and 42 and a thickness of the region where the $Al_2O_3$ particles are present can be controlled by applied amounts of electrode metal pastes.

As described above, the multilayer ceramic capacitor 1 including the external electrodes 4 having a laminated structure can be obtained by the above manufacturing method. It is noted that an insulating protective layer may be formed on each side surface 10b of the ceramic element body 10 on which the external electrodes 4 are not formed.

As shown in FIG. 1, the multilayer ceramic capacitor 1 according to the present embodiment can be directly surface-mounted on the mounting substrate 50 used inside an electronic device, etc., by using the conductive adhesive 54.

The conductive adhesive 54 is prepared by containing a conductive filler in a resin t. As the resin in the conductive adhesive 54, for example, a thermosetting resin such as an epoxy resin, polyurethane, a polyester, or a silicone resin, a thermoplastic resin such as a polypropylene, a polyamide, or a polyimide, or an ultraviolet curable resin in which the above resins and a photopolymerization initiator are blended can be used, and an epoxy-based thermosetting resin is preferable. Meanwhile, an Ag filler is used as the conductive filler.

At the time of mounting, the conductive adhesive 54 is applied on wiring patterns 52 formed on a surface 50a (mounting surface) of the mounting substrate 50. Then, the multilayer ceramic capacitor 1 is pressed onto the conductive adhesive 54 and is adhered so that the side surface 10b1 of the ceramic element body 10 is substantially parallel to the mounting surface 50a. At this time, the second electrode layers 42 and the conductive adhesive 54 are in direct contact with each other and are jointed. The extension portions of the external electrodes 4 formed on the side surface 10b1 of the ceramic element body 10 and a part of the end surface portions of the external electrodes 4 close to the mounting surface are covered with the conductive adhesive 54 and jointed.

It is noted that at the time of jointing, depending on a type of the conductive adhesive 54 to be used, a resin curning treatment performed by a heat treatment, an ultraviolet irradiation treatment, or the like is appropriately performed. For example, when an epoxy-based thermosetting resin is used, it may be heated at about 150° C. to 220° C. The pair of external electrodes 4 are insulated from each other, and an applying method and an applying amount of the conductive adhesive 54 are adjusted so that the external electrodes 4 are not short-circuited with each other.

Summary of Embodiment

In the multilayer ceramic capacitor 1 according to the present embodiment, external electrode 4 includes the first electrode layer 41 mainly containing Cu and the second electrode layer 42 mainly containing Ag. The multilayer ceramic capacitor 1 has a structure in which the second electrode layer 42 is jointed to the conductive adhesive 54 after mounted. In other words, after mounted on the substrate 50, the Ag of the second electrode layer 42 and an Ag of the conductive adhesive 54 come into contact with each other at interfaces between the external electrode 4 and the conductive adhesive 54. As a result, in the multilayer ceramic capacitor 1 according to the present embodiment, almost no potential difference between the external electrode 4 (second electrode layer 42) and the conductive adhesive 54 is generated, and occurrence of potential corrosion can be prevented.

And, the second electrode layer 42 contains a predetermined amount of Pd in the matrix phase 26a, so that oxidation and sulfurization of Ag can be prevented. Further, the copper particles 26b are dispersed in the matrix phase 26a of the second electrode layer 42. According to such a configuration, even if a voltage is applied to the multilayer ceramic capacitor 1 for a long time in a hot and humid environment, occurrence of an electromigration phenomenon and a decrease in an insulation resistance can be prevented, and durability of the multilayer ceramic capacitor 1 is improved.

Here, in the case of the prior art, the external dimensions of the ceramic element body are small; an adhesion strength of a multilayer ceramic capacitor to a mounting substrate usually tends to decrease. Additionally, the electromigration phenomenon is likely to occur after a durability test in a hot and humid environment. In the multilayer ceramic capacitor 1 according to the present embodiment, even when the ceramic element body 10 is miniaturized (for example, 2.0 mm or less×2.0 mm or less×2.0 mm or less), the decrease in the adhesion strength and the occurrence of the electromigration phenomenon after the durability test can be prevented, and the durability in the hot and humid environment can be sufficiently ensured.

In the present embodiment, the first electrode layer 41 is a denser sintered electrode than the second electrode layer 42, and the second electrode layer 42 is a sparser sintered electrode than the first electrode layer 41. By making the first electrode layer 41 dense, moisture resistance after mounting the multilayer ceramic capacitor 1 is further improved, and the durability in the hot and humid environment is further improved. By making the second electrode layer 42 in contact with the conductive adhesive 54 sparse, the conductive adhesive 54 easily penetrates into unevenness of the surface of the second electrode layer 42. As a result, an anchor effect is obtained, adhesion between the external electrode 4 and the conductive adhesive 54 is further improved, and the durability in the hot and humid environment is further improved.

It is noted that the configuration as described above in which the first electrode layer 41 is dense and the second electrode layer 42 is sparse can be implemented by controlling the area ratio of the conductor region, the aspect ratio of the non-metal portion, or the area ratio of the $SiO_2$ particles under the predetermined condition. Further, by containing the $Al_2O_3$ particles on the surface of the second electrode layer 42, the surface of the second electrode layer 42 becomes rough, and the above anchor effect can be further increased. Therefore, the durability in the hot and humid environment is further improved.

Although the embodiment of the present invention has been described above, the present invention is not limited to the above embodiment, and various modifications can be made without departing from the gist of the present invention.

For example, in the present embodiment, the multilayer ceramic capacitor 1 is exemplified as an electronic component, but the electronic component of the present invention may be, for example, a thermistor, a varistor, a filter, and an inductor. In the case of a varistor, each ceramic layer 2 is constituted by a semiconductor ceramic having a non-linear resistance characteristic. In the case of a thermistor, each ceramic layer 2 is constituted by a ceramic whose resistance value changes greatly depending on temperature. In the case of an inductor, the ceramic element body 10 may be constituted by a magnetic ceramic such as ferrite and a coil electrically connected to the pair of external electrodes 4.

In the present embodiment, the ceramic layers 2 and the internal electrode layers 3 are laminated in the Z-axis direction, and the laminating direction may be the X-axis direction or the Y-axis direction. In this case, the external electrodes 4 may be formed to match exposed surfaces of the internal electrode layers 3. Further, the ceramic element body 10 does not necessarily have to be a laminated body, and may be a single layer. Furthermore, each internal electrode in the present invention does not have to be a flat electrode (internal electrode layer 3) as described above, and may be a coil conductor region or the like.

EXAMPLES

Hereinafter, the present invention is described based on more detailed examples, and the present invention is not limited to these examples.

Experiment 1

In Experiment 1, the multilayer ceramic capacitor 1 shown in FIG. 1 was manufactured by the following procedures. First, the ceramic element body 10 in which the ceramic layers 2 containing $BaTiO_3$ as a main component and the internal electrode layers 3 containing Ni as a main component were laminated was manufactured by the method shown in the embodiment. Here, a size of the ceramic element body was (1.89±0.03) mm×(1.19±0.03) mm×(1.19±0.03) mm. Then, by applying electrode metal pastes to the ceramic element body 10 and baking, the pair of external electrodes 4 each including the first electrode layer 41 and the second electrode layer were formed.

When forming the external electrodes 4, in Experiment 1, the experiment was carried out by changing the composition of the copper particles 26b and the composition of the Ag—Pd alloy particles serving as the matrix phase 26a added to the second electrode paste, and capacitor samples according to Examples 1 to 8 were prepared. It is noted that the composition of the conductor region in each electrode layer was analyzed by the SEM-EPMA. A result of the quantitative analysis in each example is shown in Table 1.

Comparative Examples 1 to 4

In Comparative Example 1 and Comparative Example 2 of Experiment 1, no external electrode was formed into a laminated structure, but formed into an external electrode including a single electrode layer. Specifically, in Comparative Example 1, an electrode containing Cu as a main component was formed, and in Comparative Example 2, an electrode containing an Ag—Pd alloy as a main component was formed. In Comparative Example 3 and Comparative Example 4, although the external electrodes having a two-layer structure was formed, the copper particles 26b were not added to a second electrode layer which is a second layer. Results of measuring compositions of respective electrode layers of Comparative Examples 1 to 4 by the quantitative analysis with the EPMA are shown in Table 1.

It is noted that in Comparative Examples 1 to 4, experimental conditions other than the above conditions are common to those of Examples 1 to 8.

Mounting on Substrate

The capacitor samples prepared by the above method were mounted on a circuit substrate with the conductive adhesive 54. At this time, a heat-resistant conductive adhesive in which an epoxy-based thermosetting resin contains an Ag filler was used as the conductive adhesive 54. Then, the following evaluations were performed on the mounted capacitor samples.

Evaluation Content of Experiment 1

Adhesion Evaluation

In order to evaluate Adhesion strength between the external electrodes 4 and the conductive adhesive 54 after mounting, an adhesion strength test was performed. In the adhesion strength test, each capacitor sample was mounted on an alumina substrate with a conductive adhesive, and then a force of 20 N was applied for 10±1 seconds to a side surface of the capacitor sample. Then, the sample peeled off from the alumina substrate after pressurization was judged to be defective, and a non-defect rate when tested on 10 samples for each example was calculated. Note that, the non-defect rate of the adhesion strength test of 100% was considered pass. Evaluation results in each example and each comparative example are shown in Table 1.

Durability Evaluation

A pressure cooker bias test (PCBT) was performed to evaluate durability of the capacitor sample in a hot and humid environment. Specifically, the capacitor sample was left for 24 hours in an environment of a temperature of 125° C., a humidity of 95%, and an atmospheric pressure of $2.026×10^5$ Pa in a state where a voltage of 200 V was applied to the capacitor sample. An insulation resistance of the capacitor sample was measured before and after PCBT, and a sample whose insulation resistance decreased to $\frac{1}{10}$ or less after PCBT was judged to be defective. The test was performed on 10 samples for each example and each comparative example, and a non-defect rate was calculated. Note that, the non-defect rate of the PCBT (after 24 h) of 100% was considered pass. The evaluation results are shown in Table 1.

TABLE 1

| | First electrode layer | | | Second electrode layer Composition of conductor region | | | | | | Evaluation result | |
|---|---|---|---|---|---|---|---|---|---|---|---|
| | Composition of conductor region | | | Composition of matrix phase | | | Composition of copper particles | | | Adhesion evaluation | PCBT (after 24 h) |
| Sample No. | Cu mol % | Ag mol % | Pd mol % | Ag mol % | Pd mol % | Cu mol % | Cu mol % | Ag mol % | Pd mol % | Non-defect rate % | Non-defect rate % |
| Comparative Example 1 | 100 | — | — | — | — | — | — | — | — | 0 | — |
| Comparative Example 2 | — | 94 | 6 | — | — | — | — | — | — | 100 | 90 |
| Comparative Example 3 | 100 | — | — | 94 | 6 | — | — | — | — | 100 | 90 |
| Comparative Example 4 | 100 | — | — | 86 | 5 | 9 | — | — | — | 100 | 90 |
| Example 1 | 100 | — | — | 86 | 5 | 9 | 100 | — | — | 100 | 100 |
| Example 2 | 100 | — | — | 86 | 5 | 9 | 95 | — | 5 | 100 | 100 |
| Example 3 | 100 | — | — | 86 | 5 | 9 | 95 | 5 | — | 100 | 100 |
| Example 4 | 100 | — | — | 86 | 5 | 9 | 90 | 5 | 5 | 100 | 100 |
| Example 5 | 100 | — | — | 84 | 5 | 11 | 100 | — | — | 100 | 100 |
| Example 6 | 100 | — | — | 90 | 5 | 5 | 100 | — | — | 100 | 100 |
| Example 7 | 100 | — | — | 81 | 10 | 9 | 100 | — | — | 100 | 100 |
| Example 8 | 100 | — | — | 89 | 2 | 9 | 100 | — | — | 100 | 100 |

As shown in Table 1, in Comparative Example 1 in which only a Cu sintered electrode was formed as the external electrode, all results of the adhesion strength tests after mounting were defective, and a sufficient adhesion strength was not ensured. In Comparative Examples 2 to 4, although the adhesion strength after mounting was ensured, a decrease in the insulation resistance was seen after 24 h of PCBT, and the standard of the non-defect rate was not satisfied. In this regard, in Examples 1 to 8 in which the second electrode layer 42 contains the copper particles 26b, no defects were confirmed in either the adhesion strength test after mounting or the durability evaluation test (PCBT 24 h), and it was confirmed that the joint reliability (mounting reliability) was higher and the durability was improved as compared with those in Comparative Examples 1 to 4.

Additionally, the composition of the copper particles 26b were changed in Examples 1 to 4, and the composition of the matrix phase 26a were changed in Examples 5 to 8, as shown in Table 1. It was confirmed that the joint reliability and the durability can be sufficiently ensured within a range of compositions shown in Examples 1 to 8.

Experiment 2

In Experiment 2, the experiment was carried out by changing an average particle size and an addition amount of the Cu particles added to the second electrode metal paste, and capacitor samples according to Examples 11 to 20 were prepared. In each example of Experiment 2, the first electrode layer 41 was a sintered electrode having a conductor region of Cu, and the second electrode layer 42 was a sintered electrode having a conductor region of Ag 86 mol %-Pd 5 mol %-Cu 9 mol % alloy. Then, in Examples 11 to 15, the average particle size of the Cu particles was adjusted, and in Examples 16 to 20, the addition amount of the Cu particles was adjusted. Note that, the experimental conditions other than the above in Examples 11 to 20 were common to those in Example 1 of Experiment 1.

In Experiment 2, cross sections of the capacitor samples (in particular, the cross section of the second electrode layer 42) were performed mapping analysis by the SEM-EPMA, the average particle size of the copper particles 26b in the circle equivalent diameter and the area ratio of the copper particles 26b (the ratio of the area $A_P$ occupied by the copper particles 26b to the area $A_M$ occupied by the matrix phase 26a in the cross section of the second electrode layer 42) were measured. It is noted that a magnification at the time of mapping analysis was set to 3000 times to 30000 times according to the size of the copper particles 26b to be measured, and the measurement was performed in 5 or more visual fields. Measurement results are shown in Table 2.

Evaluation Content of Experiment 2

In Experiment 2, the following evaluations were carried out, in addition to the adhesion evaluation and the durability evaluation in Experiment 1.

First, in order to evaluate the adhesion strength between the external electrodes 4 and the conductive adhesive 54 after the durability test, a pressure cooker test (PCT) and the adhesion strength test were performed. In the PCT, the capacitor samples were left for 24 hours in an environment with a temperature of 125° C., a humidity of 95%, and an atmospheric pressure of $2.026 \times 10^5$ Pa. After the PCT test, the adhesion strength test was conducted in the same manner as in Experiment 1, and it was confirmed whether or not peeling occurred after the test. It is noted that as in Experiment 1, the above tests were performed on 10 samples for each example, and the non-defect rate was calculated. In the adhesion evaluation test after 24 h of the PCT, the non-defect rate of 70% or more was considered pass, and the non-defect rate of 100% is considered best.

In addition, a test was carried out, in which PCBT time was extended to 100 h to evaluate the durability in the hot and humid environment with a stricter standard. It is noted that there is no change in conditions such as temperature, humidity, and applied voltage other than the leaving time and the number of samples. This test was performed on 100 samples for each example and each comparative example, and the non-defect rate was calculated. In this PCBT (after 100 h), the non-defect rate of 95% or more was considered pass, and the non-defect rate of 100% considered best. Evaluation results in Experiment 2 are shown in Table 2.

TABLE 2

| Sample No. | First electrode layer Composition of conductor region mol % | Second electrode layer Configuration of conductor region | | | | | |
|---|---|---|---|---|---|---|---|
| | | Composition of matrix phase | | | Configuration of copper particles | | |
| | | Ag mol % | Pd mol % | Cu mol % | Composition mol % | Average particle size μm | $A_P/A_M$ % |
| Example 11 | Cu 100 mol % | 86 | 5 | 9 | Cu 100 mol % | 0.2 | 10 |
| Example 12 | Cu 100 mol % | 86 | 5 | 9 | Cu 100 mol % | 0.5 | 10 |
| Example 13 | Cu 100 mol % | 86 | 5 | 9 | Cu 100 mol % | 2 | 10 |
| Example 14 | Cu 100 mol % | 86 | 5 | 9 | Cu 100 mol % | 5 | 10 |
| Example 15 | Cu 100 mol % | 86 | 5 | 9 | Cu 100 mol % | 10 | 10 |
| Example 16 | Cu 100 mol % | 86 | 5 | 9 | Cu 100 mol % | 2 | 1 |
| Example 17 | Cu 100 mol % | 86 | 5 | 9 | Cu 100 mol % | 2 | 3 |
| Example 18 | Cu 100 mol % | 86 | 5 | 9 | Cu 100 mol % | 2 | 5 |
| Example 19 | Cu 100 mol % | 86 | 5 | 9 | Cu 100 mol % | 2 | 15 |
| Example 20 | Cu 100 mol % | 86 | 5 | 9 | Cu 100 mol % | 2 | 20 |

| Sample No. | Evaluation result | | | |
|---|---|---|---|---|
| | adhesion evaluation | | Durability evaluation | |
| | After mounting Non-defect rate % | PCT-after 24 h Non-defect rate % | PCBT-after 24 h Non-defect rate % | PCBT-after 100 h Non-defect rate % |
| Example 11 | 100 | 100 | 100 | 99 |
| Example 12 | 100 | 100 | 100 | 100 |
| Example 13 | 100 | 100 | 100 | 100 |
| Example 14 | 100 | 100 | 100 | 100 |
| Example 15 | 100 | 70 | 100 | 100 |
| Example 16 | 100 | 100 | 100 | 98 |
| Example 17 | 100 | 100 | 100 | 100 |
| Example 18 | 100 | 100 | 100 | 100 |
| Example 19 | 100 | 100 | 100 | 100 |
| Example 20 | 100 | 80 | 100 | 100 |

As shown in Table 2, in Examples 12 to 14, the non-defect rates in all tests were 100%, which indicates that the jointing reliability and the durability were particularly good. From this result, it was confirmed that the average particle size of the copper particles 26b is preferably in a range of 0.5 μm to 5 μm.

Similarly, in Examples 17 to 19, the non-defect rates in all tests were 100%, which indicates that the jointing reliability and the durability were particularly good. From this result, it was confirmed that the area ratio ($A_P/A_M$) of the copper particles 26b is preferably in a range of 3% to 15%.

Experiment 3

In Experiment 3, the experiment was performed by changing a content of a conductor region contained in an electrode metal paste, an aspect ratio of non-metal ingredients (binder and inorganic particles) in the paste, and a content of SiO₂ particles in the paste, and capacitor samples according to Examples 21 to 31 were prepared.

Regarding the prepared capacitor samples of the respective examples, the cross sections of the first electrode layer 41 and the second electrode layer 42 were observed by the SEM, and cross section images of these two layers were analyzed, so that the area ratio of the conductor region (a ratio to 100% of a measurement visual field) and the aspect ratio of the non-metal portion in each electrode layer were measured. In the measurement, a magnification was set to 3000 times, and an average value measured in 5 or more visual fields was adopted. A mapping analysis was performed by the SEM-EPMA, and a mapping image of the Si element was obtained. Then, an area where the Si element was detected by the image analysis was measured, and from a result of the measurement, an area ratio of the $SiO_2$ particles in each of the electrode layers 41 and 42 (a ratio to 100% of each electrode layer in the measurement visual field) was calculated. Measurement results in the respective examples are shown in Table 3.

It is noted that the experimental conditions other than the above conditions in Examples 21 to 31 were common to those in Example 13 in Experiment 2. That is, in each of Examples 21 to 31, the composition of the first conductor region 16 was Cu 100 mol %, the composition of the matrix phase 26a of the second electrode layer 42 was Ag 86 mol %-Pd 5 mol %-Cu 9 mol %, and the composition of the copper particles 26b was Cu 100 mol %. In Examples 21 to 31, the average particle size of the copper particles 26b was 2 μm, and the area ratio of the copper particles 26b was 10%.

Examples 21 to 31 of Experiment 3 were evaluated in the same manner as in Experiment 2. Results of the evaluation are shown in Table 3.

TABLE 3

| | First electrode layer | | | | Second electrode layer | | | |
| --- | --- | --- | --- | --- | --- | --- | --- | --- |
| | | Non-metal portion | | | | Non-metal portion | | |
| Sample No. | Conductor region Area ratio % | Aspect ratio | Area ratio of SiO$_2$ particles % | Area ratio of voids % | Conductor region Area ratio % | Aspect ratio | Area ratio of SiO$_2$ particles % | Area ratio of voids % |
| Example 21 | 95 | 1.8 | 2 | 3 | 95 | 3.7 | 3 | 2 |
| Example 22 | 95 | 1.7 | 2 | 3 | 85 | 3.8 | 5 | 10 |
| Example 23 | 95 | 1.6 | 2 | 3 | 60 | 3.3 | 25 | 15 |
| Example 24 | 75 | 1.8 | 2 | 5 | 60 | 3.3 | 25 | 15 |
| Example 25 | 70 | 1.9 | 2 | 10 | 60 | 3.3 | 25 | 15 |
| Example 26 | 76 | 1.8 | 10 | 5 | 60 | 3.6 | 25 | 15 |
| Example 27 | 69 | 1.9 | 15 | 5 | 60 | 3.9 | 25 | 15 |
| Example 28 | 69 | 1.8 | 2 | 5 | 60 | 3.7 | 5 | 35 |
| Example 29 | 69 | 1.9 | 2 | 5 | 60 | 3.5 | 2 | 38 |
| Example 30 | 95 | 2.5 | 2 | 3 | 60 | 3.3 | 25 | 15 |
| Example 31 | 95 | 1.8 | 2 | 3 | 60 | 2.5 | 25 | 15 |

| | Evaluation result | | | |
| --- | --- | --- | --- | --- |
| | adhesion evaluation | | Durability evaluation | |
| Sample No. | After mounting Non-defect rate % | PCT-after 24 h Non-defect rate % | PCBT-after 24 h Non-defect rate % | PCBT-after 100 h Non-defect rate % |
| Example 21 | 100 | 60 | 100 | 100 |
| Example 22 | 100 | 100 | 100 | 100 |
| Example 23 | 100 | 100 | 100 | 100 |
| Example 24 | 100 | 100 | 100 | 100 |
| Example 25 | 100 | 100 | 100 | 99 |
| Example 26 | 100 | 100 | 100 | 100 |
| Example 27 | 100 | 100 | 100 | 98 |
| Example 28 | 100 | 100 | 100 | 100 |
| Example 29 | 100 | 80 | 100 | 100 |
| Example 30 | 100 | 100 | 100 | 99 |
| Example 31 | 100 | 90 | 100 | 100 |

As shown in Table 3, in Examples 21 to 25, the area ratio of the conductor region in each of the electrode layers 41 and 42 was changed. In Examples 22 to 24 in which the area ratio of the conductor region was larger in the first electrode layer 41 than in the second electrode layer 42, the non-defect rates in all the tests were 100%, which indicates that the jointing reliability and the durability were particularly good. From this result, it was confirmed that by making the first electrode layer 41 dense and the second electrode layer 42 sparse, both the jointing reliability and the durability are further improved.

In Examples 26 to 29, the area ratio of SiO$_2$ particles in each of the electrode layers 41 and 42 was changed. In Examples 26 to 28 in which the area ratio of the SiO$_2$ particles was larger in the second electrode layer 42 than in the first electrode layer 41, the jointing reliability and the durability were particularly good. And, it was confirmed that the area ratio of the SiO$_2$ particles in the first electrode layer is preferably 10% or less, and more preferably 5% or less. Meanwhile, it was confirmed that the area ratio of the SiO$_2$ particles in the second electrode layer 42 is more preferably 5% or more.

From a result of Example 30, it was confirmed that the aspect ratio of the first non-metal portion 18 in the first electrode layer 41 is preferably 2.5 or less, and more preferably 2.0 or less. Meanwhile, from a result of Example 31, it was confirmed that the aspect ratio of the second non-metal portion 28 in the second electrode layer 42 is preferably 2.5 or more, and more preferably 3.0 or more.

Experiment 4

In Experiment 4, in order to confirm an effect of presence of the Al$_2$O$_3$ particles near the surface of the second electrode layer 42, a sample (Example 41) in which the Al$_2$O$_3$ particles were not present near the surface and a sample (Example 42) in which the Al$_2$O$_3$ particles were present near the surface were prepared. Then, the jointing reliability and the durability of the two examples were compared. It is noted that Example 41, which does not contain the Al$_2$O$_3$ particles, has the same experimental conditions as those in Example 23 of Experiment 3, and is the same sample. Meanwhile, in Example 42, the second electrode metal paste was applied in the same manner as in Example 23 of Experiment 3, and then a second electrode metal paste containing the Al$_2$O$_3$ particles was applied to form the second electrode layer 42. However, in Examples 41 and 42, applied amounts of the paste were controlled so that average thicknesses of the second electrode layers 42 were the same.

When the cross section of the second electrode layer 42 was performed mapping analysis in Example 42, it was confirmed that the Al$_2$O$_3$ particles were present in a region of 10 μm from the outermost surface of the second electrode layer 42 in a depth direction.

Evaluation Content of Experiment 4

In Experiment 4, in order to evaluate the adhesion strength between the external electrodes 4 and the conductive adhesive 54 after the durability test with a stricter standard, an adhesion strength test was performed after 100 hours of PCT, and the non-defect rate was calculated. Evaluation results are shown in Table 4.

TABLE 4

| | | Evaluation result | | | | |
|---|---|---|---|---|---|---|
| | | Adhesion evaluation | | | Durability evaluation | |
| Sample No. | Al$_2$O$_3$ particles Present or not | after mounting Non-defect rate % | PCT-after 24 h Non-defect rate % | PCBT-after 100 h Non-defect rate % | PCBT-after 24 h Non-defect rate % | PCBT-after 100 h Non-defect rate % |
| Example 41 | No | 100 | 100 | 90 | 100 | 100 |
| Example 42 | Yes | 100 | 100 | 100 | 100 | 100 |

As shown in Table 4, in Example 42 in which the Al$_2$O$_3$ particles were present only near the surface of the second electrode layer 42, the non-defect rates were 100% in all the tests, which indicates that the jointing reliability and the durability were particularly good. From this result, it was confirmed that by containing the Al$_2$O$_3$ particles on the surface of the second electrode layer 42, the adhesion between the external electrodes 4 and the conductive adhesive 54 is increased, and the jointing reliability is further improved.

It is noted that although details are omitted, an experiment in which the external dimensions of the ceramic element body 10 were changed was also carried out in addition to the above examples. As a result, it was confirmed that, as long as a sample has the characteristics of the present invention, even if a ceramic element was made smaller than those in the above Experiments 1 to 4, the durability in the hot and humid environment was good after the durability test without a decrease in the adhesion strength or a decrease in the insulation resistance due to the electromigration phenomenon, etc.

REFERENCE SIGNS LIST

1 multilayer ceramic capacitor
10 ceramic element body
2 ceramic layer
3 internal electrode layer
4 external electrode
41 first electrode layer
16 first conductor region
18 first non-metal portion
18a inorganic particle
18b void
42 second electrode layer
26 second conductor region
26a matrix phase
26b copper particle
28 second non-metal portion
28a inorganic particle
8aa Al$_2$O$_3$ particle
28b void
50 mounting substrate
52 wiring pattern
54 conductive adhesive

What is claimed is:

1. An electronic component comprising:
   a ceramic element body including an internal electrode; and
   an external electrode formed on an outer surface of the ceramic element body, wherein
   the external electrode includes:
   a first electrode layer electrically connected to at least a part of the internal electrode; and
   a second electrode layer formed on an outside of the first electrode layer,
   the first electrode layer has a first conductor region containing copper, and
   the second electrode layer has a second conductor region including a matrix phase containing silver and palladium, and copper particles dispersed in the matrix phase.

2. The electronic component according to claim 1, wherein
   the matrix phase in the second conductor region further contains copper, and
   a palladium content is 2 mol % to 10 mol %, a copper content is 5 mol % to 11 mol %, and a balance is silver, in the matrix phase.

3. The electronic component according to claim 1, wherein
   an average particle size of the copper particles contained in the second conductor region is 0.5 µm to 5.0 µm.

4. The electronic component according to claim 1, wherein
   a ratio ($A_P/A_M$) of $A_P$ to $A_M$ is 3% to 15%, in which $A_M$ is an area occupied by the matrix phase and $A_P$ is an area occupied by the copper particles, in a cross section of the second electrode layer.

5. The electronic component according to claim 1, wherein
   an area ratio occupied by the first conductor region in a cross section of the first electrode layer is larger than an area ratio occupied by the second conductor region in a cross section of the second electrode layer.

6. The electronic component according to claim 1, wherein
   the first electrode layer further includes a first non-metal portion dispersed in the first electrode layer, and
   the second electrode layer includes a second non-metal portion dispersed in the second electrode layer.

7. The electronic component according to claim 6, wherein
   an aspect ratio of the second non-metal portion in a cross section of the second electrode layer is larger than an aspect ratio of the first non-metal portion in a cross section of the first electrode layer.

8. The electronic component according to claim 6, wherein
   the first electrode layer contains particles containing a silicon oxide as the first non-metal portion,
   the second electrode layer contains particles containing a silicon oxide as the second non-metal portion, and
   the second electrode layer has a higher content of the particles containing the silicon oxide than that of the first electrode layer.

9. The electronic component according to claim 6, wherein
particles containing an aluminum oxide as a main ingredient are contained as the second non-metal portion near a surface of the second electrode layer.

10. The electronic component according to claim 1, wherein
the copper particles contained in the second conductor region contain palladium.

11. The electronic component according to claim 1, wherein
the copper particles contained in the second conductor region contain silver.

\* \* \* \* \*